March 17, 1959     N. F. BOLES     2,877,833
CHILD'S AUTOMOBILE SAFETY BELT
Filed Feb. 15, 1957
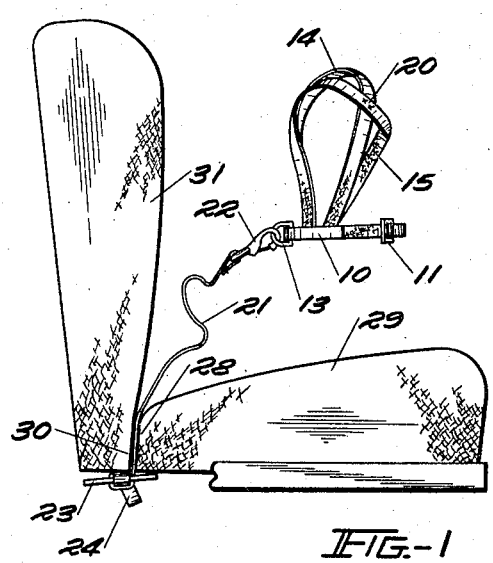
FIG.-1
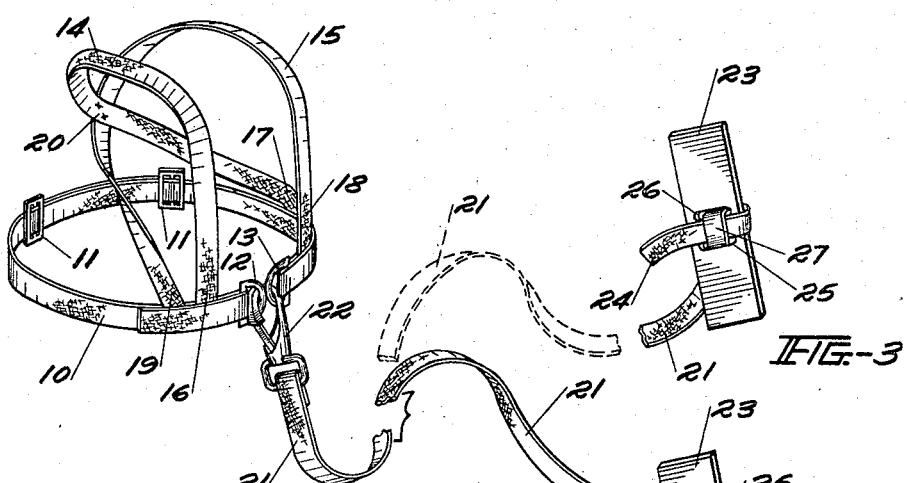
FIG.-2
FIG.-3
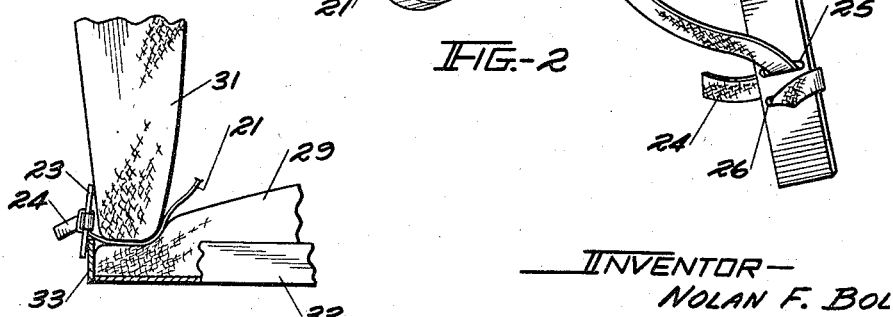
FIG.-4
INVENTOR—
NOLAN F. BOLES
By— Herbert A. Weinburn
ATTORNEY

United States Patent Office 2,877,833
Patented Mar. 17, 1959

2,877,833

CHILD'S AUTOMOBILE SAFETY BELT

Nolan F. Boles, Indianapolis, Ind.

Application February 15, 1957, Serial No. 640,510

1 Claim. (Cl. 155—189)

This invention relates to a structure designed to hold a child against being thrown forwardly or even laterally from an automobile seat so that the child will not come into contact with some solid obstruction such as the instrument board, windshield, or the side door of the automobile, when the car is suddenly stopped either by brake application, or by a collision.

There is a problem involved in holding a child safely on a seat when using a restraining device, of holding the restraining device on the child or about the child in such a manner that it cannot be easily disengaged by the child, and yet will permit some freedom of motion of the child on the seat, particularly in view of the fact that children become more or less restless when the automobile carrying them traverses some little distance. Also children are prone to be twisting and squirming around trying to see out through the windshield and the windows of the car at the most unexpected time, so that any device to retain the child against being thrown from the seat needs to provide for the limited freedom of motion.

Another problem encountered in devising a safety device of the nature of the present invention is how to anchor the device in the car without having to bore holes through the floor or to come into contact with the framework of the chassis and the like.

My invention meets these various situations and solves those problems in a very simple and yet most unique and satisfactory manner as will be indicated to those versed in the art in the following description of one particular form of the invention as illustrated in the accompanying drawing, in which:

Fig. 1 is a view in side elevation of an automobile seat and back construction to which the invention is applied;

Fig. 2 is a view in perspective of the device on an enlarged scale;

Fig. 3 is a view in perspective from an opposite side of the anchor as compared to the side shown in Fig. 2; and Fig. 4 is a view in side elevation and partial section of a front seat construction to which the invention is applied.

The device includes a belt 10 which may be fixed in length such as herein shown to be adjustable in length through slide members 11, and the ends of this belt 10 carry D-shaped eyes 12 and 13. This belt is intended to pass around the child preferably near the waistline, and in order to retain the belt in that approximate position, there is an upper harness provided which consists in the form herein shown as two loops of fabric material such as webbing, and designated by the numerals 14 and 15. The loop 14 has a lower end portion 16 adjacent the eye 12, and is secured to the belt 10 to extend therefrom and around to be secured to a portion of the belt 10 adjacent the other eye or ring 13. This other end portion of loop 14 is designated by the numeral 17. The other loop 15 has an end portion 18 secured to the belt 10 intermediate the eye 13 and the end portion 17, and extends upwardly to loop around and have an end portion 19 secured to the belt 10 near the zone where the end 16 is likewise secured. The loops 14 and 15 thus will cross each other on what may be termed the forward side, and are preferably interconnected at the crossing zone 20 by any suitable manner, such as by riveting, or as herein shown by stitching. These loops 14 and 15 fit over the shoulders of the child to have the end portions 16 and 18 on the rear side, whereas the end portions 17 and 19 come around under the arms to the rear side of the child where they are secured to the belt 10 as above described.

A strap or length of webbing 21 carries on one end a snap fastener 22 which is of sufficient size to be readily snapped through the two eyes 12 and 13 as indicated in Fig. 2. This strap 21 is then secured to a rectangular anchor plate 23 by carrying an opposite end portion 24 through a transverse slot 25 from one side of the anchor 23 to the opposite side; then back through the anchor 23 through the slot 26; and thence carried around to one side of the anchor 23 and back on the opposite side, Fig. 3, to have the end portion 24 slipped under the loop 27 which is formed when the strap passes from the slot 25 to the slot 26. The strap 21 is then pulled snugly from that side of the anchor 23 where it initially entered the slot 25, Fig. 2, so that the end portion 24 is compressibly engaged under the loop 27 and thereby prevents the strap 21 from being pulled any farther distance from the anchor 23. This interconnection of the strap and the anchor 23 is thus made adjustable in order that there may be a variance in the length of the strap 21 from the eyes 12, 13 and the anchor 23. This actual length 21 may be determined by trial in accordance with the size of the child to be restrained.

The anchor 23 being a rather thin section of metal highly resisting tendency to bend is inserted downwardly between the rear edge 28 of the seat cushion 29 and the lower front side 30 of the seat back 31, and on through to come under the back 31 and under the seat 29 as indicated in Fig. 1, to have the anchor 23 turned to have its longest dimension crosswise of the zone between the seat and back portions 28 and 30, this zone normally being compressibly closed by reason of the yielding of the upholstery.

Experience has shown that this makes a very good, solid anchoring of the device all without having to go on down to be bolted to the floor or to be carried through the floor to some frame member of the automobile.

Thus it is to be seen that I have provided an exceedingly simple yet most effective device which will offer the least irritation to the child being restrained from getting off of the seat voluntarily and certainly it is most effective in preventing the accidental throwing of a child from the seat. As above indicated, the anchor 23 is made out of a plate of metal of a nature quite resistant to bending. On the other hand, the area of this plate 23 is kept at a minimum so that its relation to the thickness of the lower portion 30 of the seat 31 is such that it will not extend to the rear of that back 31, and yet will extend forwardly under the seat portion 28.

The foregoing description of the attachment of the safety belt to a seat and seat back has been made in reference to that form of a construction shown in Fig. 1 which is the typical construction for the majority of back seats of cars, and in a few instances is the construction used for the front seat. However in some instances, the construction will vary in that the front seat 29 will extend under the lower end of the back 31 as indicated in Fig. 4. In this instance, the strap 21 will be extended under the lower end of the back 31 and over the top of the depressed portion at the rear end of the seat cushion 29, and the strap will be pushed on out over the back of the retaining metal band 33, and then the strap will be inserted through the plate 23 and tied thereto as has been before indicated.

The only difference here is that the strap 21 will have to be inserted first under the back 31 prior to its being secured to the plate. That is, the plate is put on after the insertion between the seat cushion and the back cushion. In this construction, the plate 23 is visible from the rear side of the back 31, and will bear against the plate 33 and the lower end of the back 31 in a vertically disposed position, all as indicated in Fig. 4.

Therefore while I have herein shown and described my invention in the one particular form, it is obvious that structural changes may be employed without departing from the spirit of the invention, and I therefore do not desire to be limited to that precise form beyond the limitations which may be imposed by the following claim.

I claim:

A safety device for an automobile seated occupant comprising the combination with an upholstered seat structure and a resilient upholstered back structure, the upholstery of said seat structure normally abuting the upholstery of said back structure at its lower end zone with a potential spacing therebetween had upon compressibly spreading apart the upholstery of both seat and back structures in said zone: of a harness engaging about said occupant; a strap leading from said harness through said zone from the front side of said back structure and extending by an end portion therebeyond; and a plate engaged to said end portion; said strap to plate engagement being at approximately a central zone of the plate providing areas of the plate extending from said plate zone which areas freely bear and are compressibly in bridging contact against portions of said seat and back structures removed from said zone thereof by a forward and upward pull of the strap over said seat structure; thereby restraining said strap to pivoting action in said seat-back structure zone.

References Cited in the file of this patent

UNITED STATES PATENTS

| | | |
|---|---|---|
| 1,316,163 | Kennedy | Sept. 16, 1919 |
| 1,326,716 | Dunning | Dec. 30, 1919 |
| 1,712,198 | Clapp | May 7, 1929 |
| 1,991,633 | Serpico | Feb. 19, 1935 |
| 2,848,036 | Campbell | Aug. 19, 1958 |

FOREIGN PATENTS

| | | |
|---|---|---|
| 303,282 | Great Britain | Jan. 3, 1929 |

OTHER REFERENCES

Mechanix Illustrated, vol. 48, No. 6, p. 88 (Ostrander), April 1953.